Patented Dec. 19, 1933

1,940,624

UNITED STATES PATENT OFFICE 1,940,624

DRY SPICING

Edward E. Feight, Chicago, Ill., assignor to Food Materials Corporation, Chicago, Ill., a corporation of Illinois No Drawing. Application October 14, 1929
Serial No. 399,698

1 Claim. (Cl. 99—11)

My invention relates to dry spicings and the process of producing the same. It is the object of my invention to provide a new and improved form of dry spicings for use particularly in connection with sausage, frankfurters, and other meat products and pickled vegetables and the like.

The dry spices of the ordinary form comprising the plain finely ground products of the various types used lack uniformity and are hard to mix thoroughly with the meat so as fully to avoid specking. Moreover, the ordinary user of such spices lacks the knowledge and the facilities required for testing the actual flavoring or seasoning values of the various spices, so that when spices have deteriorated such ordinary user is unable to obtain standard results. Spices in liquid form on the other hand are not practical as it is difficult if not impossible to produce a stable emulsion that will keep the seasoning oils in uniform suspension. Further, it is impossible to combine in a liquid seasoning the most essential spice required in seasoned meats, namely, white or black pepper or both. Spoiling, decomposition, and rancidity are common faults of liquid seasonings.

It is the object of my invention to provide an improved spice product which shall overcome the difficulty encountered in connection with the former spicings. To this end, it is one of the objects of my invention to provide a mixed spice preparation which shall be of substantially precise uniformity throughout, which shall be capable of preservation up to uniform strength without difficulty, and which shall be capable of ready mixing with the meat products with which it is to be used. It is another object of my invention to provide an improved process for making such product.

It is another object of my invention to improve products and methods of this kind in sundry details hereinafter pointed out. The preferred means by which I have accomplished my improved results are described in the following specification, and that which I believe to be new is set forth in the claim.

For carrying out my invention, I first provide a vehicle or base comprising the sugar, salt and pepper content of the spice product, the salt and pepper being finely ground. These three ingredients are preferably combined by being mixed in any suitable mixer until uniformly distributed throughout, the ingredients being preferably 6 parts by weight of white or black pepper or a mixture of both, 5 parts by weight of salt, and 5 parts by weight of sugar in either granulated or powdered form.

My improved spice for use in pork sausage is preferably prepared by taking 8 pounds of my improved vehicle as above described, and adding thereto the following:

| | Ounces |
|---|---|
| Oil of sage | ¾ |
| Oil of nutmeg | ½ |
| Oil of mace | ½ |
| Oleoresin of ginger | ¾ |
| Oleoresin of capsicum | 1⅞ |
| Oil of thyme | 1/16 |
| Natural mustard oil | 1/16 |

All these oils and oleoresins are added gradually to the vehicle and the mixing is continued until the mixture is uniform throughout.

For use in frankfurters the mixture is preferably prepared by taking 8 pounds of my improved vehicle as above described and adding thereto the following:

| | Ounces |
|---|---|
| Oleoresin of capsicum | 1⅞ |
| Oil of mace | ¾ |
| Oil of nutmeg | ¾ |
| Oleoresin of ginger | ½ |
| Oil of coriander | ¼ |
| Oil of pimento (allspice) | ¼ |
| Oil of marjoram | 3/32 |
| Oil of mustard | 1/16 |

The essential oils and oleoresins in this case also are added gradually to the vehicle and the mixing is again continued until the mixture is uniform throughout.

I have found in practice that 10 ounces of my improved dry spice mixture is sufficient for 100 pounds of sausage, the spices being preferably added to the meat in the chopper, and the mixing being continued until uniform results are attained. I have found that my improved spice products may be much more easily mixed with the meat than can the plain dry ground spices such as have been in use heretofore.

While I prefer to employ the process as above described for preparing my improved products, and prefer to employ substantially the proportions as set forth above, it is to be understood that I do not limit my invention thereto, except so far as the claim may be so limited by the prior art.

I claim:—

A dry spice product, comprising a mixture of finely ground comparatively non-volatile seasoning agents including major proportions of sugar, salt and pepper, and a comparatively much smaller quantity of oils of spices uniformly distributed through said mixture.

EDWARD E. FEIGHT.